(12) United States Patent
Park et al.

(10) Patent No.: US 12,204,380 B2
(45) Date of Patent: Jan. 21, 2025

(54) ELECTRONIC DEVICE INCLUDING FOOT STRUCTURE

(71) Applicant: Samsung Electronics Co., Ltd., Gyeonggi-do (KR)

(72) Inventors: Chahoon Park, Gyeonggi-do (KR); Haesoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 17/946,306

(22) Filed: Sep. 16, 2022

(65) Prior Publication Data

US 2023/0084065 A1  Mar. 16, 2023

Related U.S. Application Data

(63) Continuation of application No. PCT/KR2022/013706, filed on Sep. 14, 2022.

(30) Foreign Application Priority Data

Sep. 16, 2021 (KR) ........................ 10-2021-0124193

(51) Int. Cl.
  *G06F 1/16* (2006.01)
(52) U.S. Cl.
  CPC ............ *G06F 1/166* (2013.01); *G06F 1/1618* (2013.01); *G06F 1/1681* (2013.01)
(58) Field of Classification Search
  None
  See application file for complete search history.

(56) References Cited

U.S. PATENT DOCUMENTS 10,599,187 B2 * 3/2020 Tamura ............. H01H 13/7065
10,852,775 B1 * 12/2020 Kim ........................ G06F 1/203
11,016,528 B2 * 5/2021 Lin ........................ G06F 1/1616
(Continued)

FOREIGN PATENT DOCUMENTS

CN          103257674 A      8/2013
CN          107122010 A      9/2017
(Continued)

OTHER PUBLICATIONS

International Search Report dated Dec. 26, 2022.
Extended European Search Report dated Sep. 18, 2024.

*Primary Examiner* — Anthony Q Edwards
*Assistant Examiner* — Rashen E Morrison
(74) *Attorney, Agent, or Firm* — Cha & Reiter, LLC

(57) ABSTRACT

An electronic device is provided. The electronic device comprises a housing assembly comprising a first housing and a second housing configured to rotate with respect to the first housing, a hinge module that is coupled to the first housing and the second housing, the hinge module comprising a rotation gear, a gear assembly comprising a pinion gear rotatably coupled to the rotation gear, a rack gear configured to slide in a first axial direction based on rotation of the pinion gear, a cam structure coupled to the rack gear, and a foot structure coupled to the first housing, the foot structure being moveable in a second axial direction that perpendicular to the first axial direction, based on a first movement of the cam structure and moveable in a third axial direction that perpendicular to the first axial direction, based on a second movement of the cam structure.

23 Claims, 19 Drawing Sheets

(56) References Cited

U.S. PATENT DOCUMENTS

| | | | |
|---|---|---|---|
| 11,360,522 B2* | 6/2022 | Ho | G06F 1/1681 |
| 11,573,602 B2* | 2/2023 | Lin | G06F 1/1641 |
| 11,778,764 B2* | 10/2023 | Zhang | G06F 1/1681 |
| | | | 361/807 |
| 11,782,487 B2* | 10/2023 | Shen | G06F 1/1681 |
| | | | 361/679.27 |
| 2013/0229763 A1 | 9/2013 | Guo | |
| 2014/0063700 A1 | 3/2014 | Kawada et al. | |
| 2018/0210507 A1 | 7/2018 | Morrison et al. | |
| 2018/0267570 A1 | 9/2018 | Chuang et al. | |
| 2020/0183451 A1 | 6/2020 | Lin et al. | |
| 2021/0089077 A1 | 3/2021 | Wang et al. | |

FOREIGN PATENT DOCUMENTS

| | | |
|---|---|---|
| CN | 110442188 A | 11/2019 |
| CN | 112799473 A | 5/2021 |
| JP | 2000-112573 A | 4/2000 |
| JP | 2014-67396 A | 4/2014 |
| KR | 1998-067619 U | 12/1998 |
| KR | 10-0608951 B1 | 8/2006 |
| KR | 10-2011-0091221 A | 8/2011 |
| TW | 200833218 A | 8/2008 |
| TW | M434967 U1 | 8/2012 |
| TW | 201835709 A | 10/2018 |

\* cited by examiner

ELECTRONIC DEVICE INCLUDING FOOT STRUCTURE

CROSS REFERENCE TO RELATED APPLICATION(S)

This application is a continuation of International Application No. PCT/KR2022/013706, filed on Sep. 14, 2022, in the Korean Intellectual Property Office and claiming priority to Korean Patent Application No. 10-2021-0124193, filed on Sep. 16, 2021, in the Korean Intellectual Property Office, the disclosure of which are incorporated by reference herein their entirety.

BACKGROUND

Technical Field

Certain embodiments of the disclosure relate to an electronic device including a foot structure for supporting the electronic device in a given position (e.g., angled relative to a surface).

Description of Related Art

Electronic devices may refer to devices that are configured to perform specific functions according to installed programs. Such electronic devices may include, for example, home appliances, electronic wallets, portable multimedia players, mobile communication terminals, tablet PCs, video/audio devices, desktop/laptop computers, and/or vehicle navigation systems. The electronic devices may output stored information as sounds or images (e.g., motion pictures or still photos). In line with the high degree of integration of electronic devices and the widespread use of super-fast large-capacity wireless communication, it has recently become possible to equip a single electronic device (for example, mobile communication terminal) with certain functions. For example, not only a communication function, but also an entertainment function (for example, gaming), a multimedia function (for example, music/video playback), communication and security functions for mobile banking and the like, a scheduling function, and an electronic wallet function may be integrated into a single electronic device. Such electronic devices have become compact such that users can conveniently carry the same.

Electronic devices (for example, laptops) having communication functions, such as portable terminals, have become compact and lightweight to maximize portability and convenience of users, and integrated components tend to be arranged in smaller spaces for high performance. When an electronic device (for example, a laptop) is unfolded, the display may be used to provide information to the user, and the electronic device, when not used, may be closed to be carried conveniently.

An electronic device may include a body part, a display part, a hinge module connected to the body part and the display part, and a foot structure configured to support the electronic device at a given position (e.g., an angled position) and to reduce the slipping of the body part relative to a surface on which the electronic device is placed. For example, when the body part is adjacent to the ground on which the electronic device is position, the amount of air flowing into the electronic device may be reduced. In addition, if the distance between the electronic device and the ground is increased by using an ergo lift hinge, the angle by which the body part can rotate with regard to the display part may be limited.

The foregoing section of this document introduces information about and/or from the art that may provide context for or be related to the subject matter described herein and/or claimed below. It provides background information to facilitate a better understanding of the certain aspects of the that which is claimed below. This is a discussion of "related" art. That such art is related in no way implies that it is also "prior" art. The related art may or may not be prior art. The discussion in this section of this document is to be read in this light, and not as admissions of prior art.

SUMMARY

Certain embodiments of the disclosure may provide an electronic device capable of reducing the internal temperature of the electronic device and transferring heat generated by the electronic device to the outside of the electronic device.

Certain embodiments of the disclosure may provide a hinge module configured to connect a body part and a display part such that the same can rotate by 360°.

According to certain embodiments of the disclosure, an electronic device may include a housing assembly including a first housing and a second housing configured to rotate with respect to the first housing, a hinge module that is coupled to the first housing and the second housing and includes a rotation gear, a gear assembly including a pinion gear rotatably connected to the rotation gear, a rack gear configured to slide in a first direction, based on rotation of the pinion gear, and a cam structure connected to the rack gear, and a foot structure coupled to the first housing, the foot structure being moveable in a second axial direction that perpendicular to the first axial direction, based on a first movement of the cam structure and moveable in a third axial direction that perpendicular to the first axial direction, based on a second movement of the cam structure.

According to certain embodiments of the disclosure, an electronic device may include a housing including a first housing and a second housing configured to rotate with respect to the first housing, a hinge module coupled to the first housing and the second housing and includes a rotation gear, a gear assembly including a pinion gear rotatably coupled to the rotation gear, a rack gear configured to slide based on rotation of the pinion gear, and a cam structure coupled to the rack gear, and a foot structure connected to the first housing, the foot structure including a foot structure holder including a protruding area configured to receive pressure provided from the cam structure, and a support area connected to the foot structure holder and configured to support the electronic device.

An electronic device according to certain embodiments of the disclosure may include a foot structure, the length of which is changed based on an angle between housings. The foot structure may increase the distance between the electronic device and the ground on which the electronic device is seated. For example, if the distance between the electronic device and the ground is increased, the flow rate of air flowing into the electronic device may increase, and radiant heat transferred from the ground to the electronic device may be reduced, thereby improving heat dissipation from the electronic device.

An electronic device according to certain embodiments of the disclosure may include a hinge module connected to housings. The electronic device may be rotated 360° by using the hinge module, thereby improving user convenience.

These and other aspects of the disclosure are described hereinbelow with reference to the accompanying drawings.

DETAILED DESCRIPTION

Figure 1:
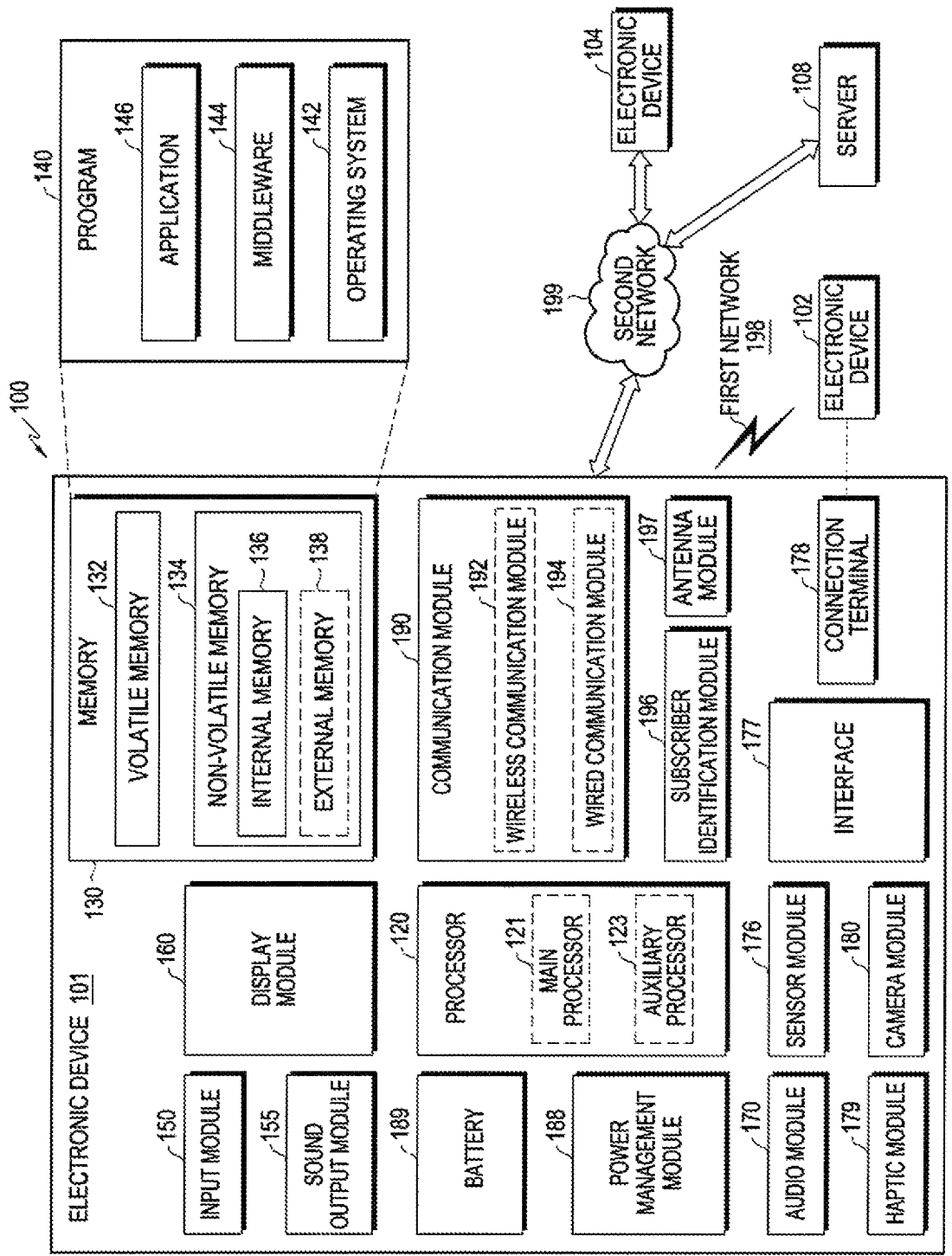
FIG. 1 is a block diagram illustrating an electronic device in a network environment according to certain embodiments of the disclosure.

FIG. 1 is a block diagram illustrating an electronic device in a network environment according to certain embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of certain types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
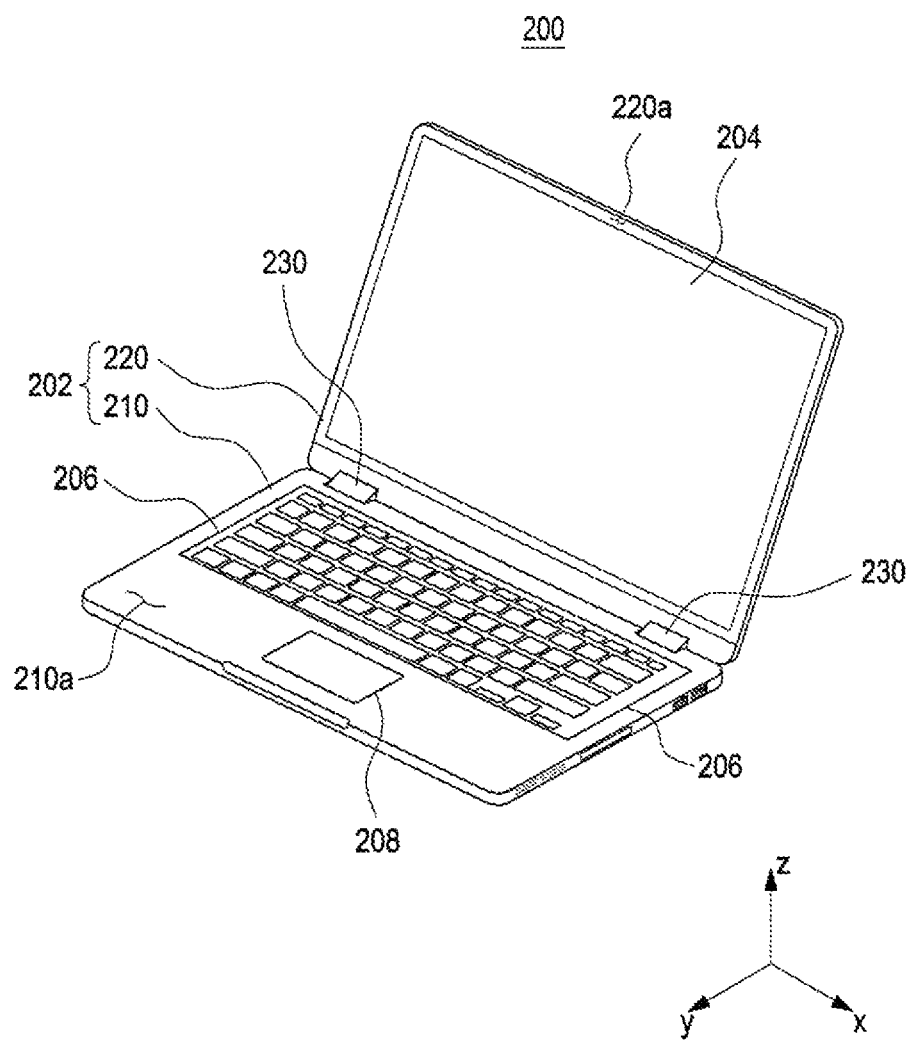
FIG. 2 is a perspective view of an electronic device in a first state according to certain embodiments of the disclosure.
Figure 3:
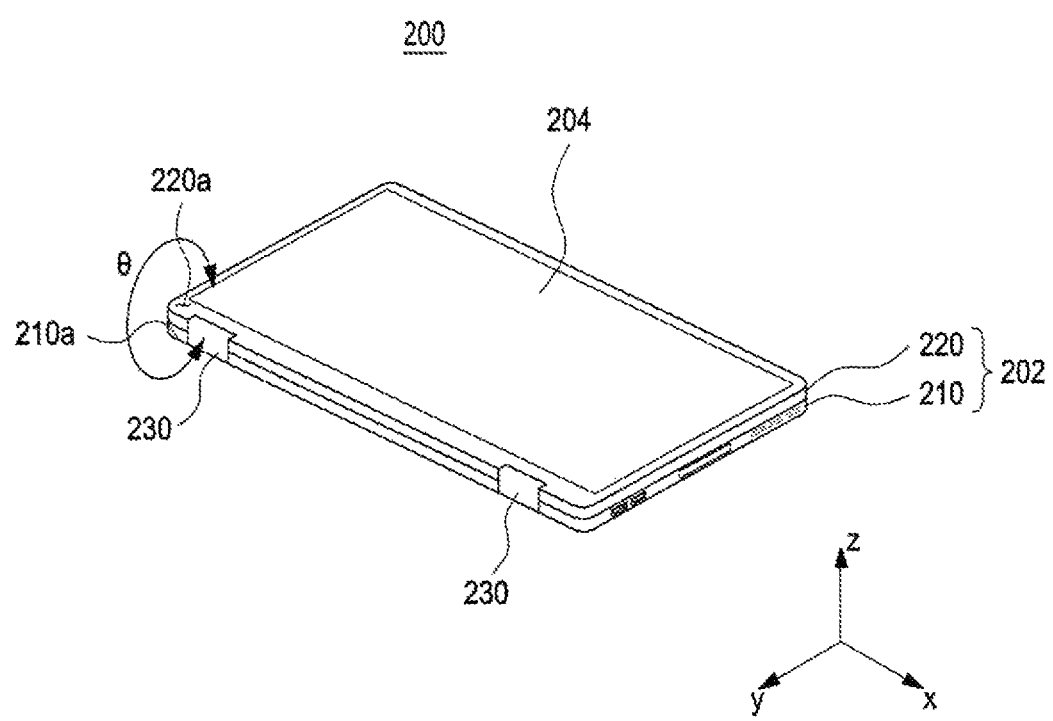
FIG. 3 is a perspective view of an electronic device in a second state according to certain embodiments of the disclosure.

FIG. 2 is a perspective view of an electronic device in a first state according to certain embodiments of the disclosure. FIG. 3 is a perspective view of an electronic device in a second state according to certain embodiments of the disclosure.

Referring to FIG. 2 and FIG. 3, an electronic device 200 may include a housing 202 and a display 204. According to an embodiment, the electronic device 200 may be, for example, a laptop computer, a notebook computer, or a portable terminal. The configuration of the electronic device 200 of FIG. 2 may be entirely or partially the same as the configuration of the electronic device 101 of FIG. 1.

According to certain embodiments, the housing 202 may form at least a part of the exterior of the electronic device 200, or may support a component (e.g., a display 204) of the electronic device 200. For example, the housing 202 may be configured to accommodate at least one of a display 204, an input device 206, or atouch pad 208.

According to certain embodiments, the electronic device 200 may be opened or closed. For example, the housing 202 may include a first housing 210 and a second housing 220 configured to be rotatable with respect to the first housing 210. According to an embodiment, the electronic device 200 may include at least one hinge module 230 that couples the first housing 210 and the second housing 220.

According to certain embodiments, the first housing 210 may be configured to rotate within a designated angle range (e.g., 0 degree to 360 degrees) with respect to the second housing 220 by using the hinge module 230. For example, the electronic device 200 may be configured to operate in a first state. As shown in FIG. 2, for example, the first state may be a clamshell mode. In the first state, the angle, the first state may be otate within a designated angle range (e.g., 0 degree to 360 degrees) with respond housing 220 may be about 90 degrees to 130 degrees. In another example, the electronic device 200 may be configured to operate in a second state. For example, as shown in FIG. 3 the second state may be a tablet mode. In the second state, the angle vice 200 may be configured to operate degree to 360 degrees) with respond housing 220 may be about 90 degrees to 130 degrees. ng 220 by using the hinge module 230. to the second housing 220 may be interpreted as the rotation of the second housing 220 with respect to the first housing 210.

According to certain embodiments, the housing 202 may be formed of a metallic material or a non-metallic material having the rigidity of a selected size. According to an embodiment, at least a portion of the electronic device 200, which is formed of the metal material, may be configured to provide a ground plane, and may be electrically coupled to a ground line formed on a printed circuit board (not shown). For example, the housing 202 may be electrically coupled to the printed circuit board via a capacitive component.

According to certain embodiments, the display 204 may be a flexible display, at least a portion of which can be transformed into a flat surface and/or a curved-surface. For example, the display 204 may be a foldable or a rollable display. The configuration of the display 204 may be entirely or partially the same as the configuration of the display module 160 of FIG. 1. According to an embodiment, the display 204 may be configured to be accommodated in the second housing 220. For example, at least a part of the display 204 may be disposed in the second housing 220. According to an embodiment, at least a part of the display 204 may be visually exposed to the outside of the electronic device 200. According to an embodiment, the second housing 220 may be interpreted as a display part.

According to certain embodiments, the display 204 may be coupled to or may be disposed adjacent to a touch detection circuit, a pressure sensor configured to measure the intensity (pressure) of touch, and/or a digitizer configured to detect a stylus pen of a magnetic field type.

According to certain embodiments, the electronic device 200 may include the input device 206 capable of detecting a user input (e.g., a pressure). According to an embodiment, the input device 206 may be configured to be accommodated in the first housing 210. For example, the input device 206 may be disposed on the first housing 210. According to an embodiment, in a state in which the electronic device 200 is closed, the input device 206 may have at least a part configured to face at least a part of the display 204. The configuration of the input device 206 of FIG. 2 may be entirely or partially the same as the configuration of the input module 150 of FIG. 1. For example, the input device 206 may be a keyboard. According to an embodiment, the first housing 210 may be interpreted as a body part.

According to certain embodiments, the electronic device 200 may include the touch pad 208 configured to detect or receive a user input. According to an embodiment, the touch pad 208 may include a capacitive touch sensor, a touch sensor based on resistive sensing, an optical touch sensor, and/or a surface acoustic wave touch sensor. For example, the touch pad 208 may be configured to detect current, pressure, light, and/or vibration caused by an input applied to the touch pad 208 by a user, and a processor (e.g., the processor 120 of FIG. 1) and/or the touch pad 208 may be configured to determine a user input, based on changes in the detected current, pressure, light, and/or vibration. According to an embodiment, the touch pad 208 may include a display. For example, the touch pad 208 may include a pressure-sensitive touch screen, a capacitive touch screen, and/or an infrared touch screen.

According to certain embodiments, the processor 120 and/or the touch pad 208 may be configured to determine an input position (e.g., an XY coordinates) by a user. According to an embodiment, the touch pad 208 may be configured to detect the pressure to the touch pad 208. For example, the touch pad 208 may be configured to detect a force in the thickness direction thereof (e.g., the Z-axis direction) by using a switch member (not shown) and at least one force sensor (not shown). According to an embodiment, the touch pad 208 may be configured to detect an external object (e.g., a user's finger or a stylus) when the external object directly touches or closely approaches the surface of the touch pad 208.

According to certain embodiments, the touch pad 208 may be configured to be accommodated in the first housing 210. For example, the touch pad 208 may be coupled to the first housing 210, and may have at least one part that is exposed to the outside of the first housing 210.

According to an embodiment, the touch pad 208 may be configured to be adjacent to the input device 206. According to an embodiment, in a state in which the electronic device 200 is closed, the touch pad 208 may have at least one part that is configured to face the display 204. The configuration of the touch pad 208 may be entirely or partially the same as the configuration of the input module 150 of FIG. 1.

Figure 4:
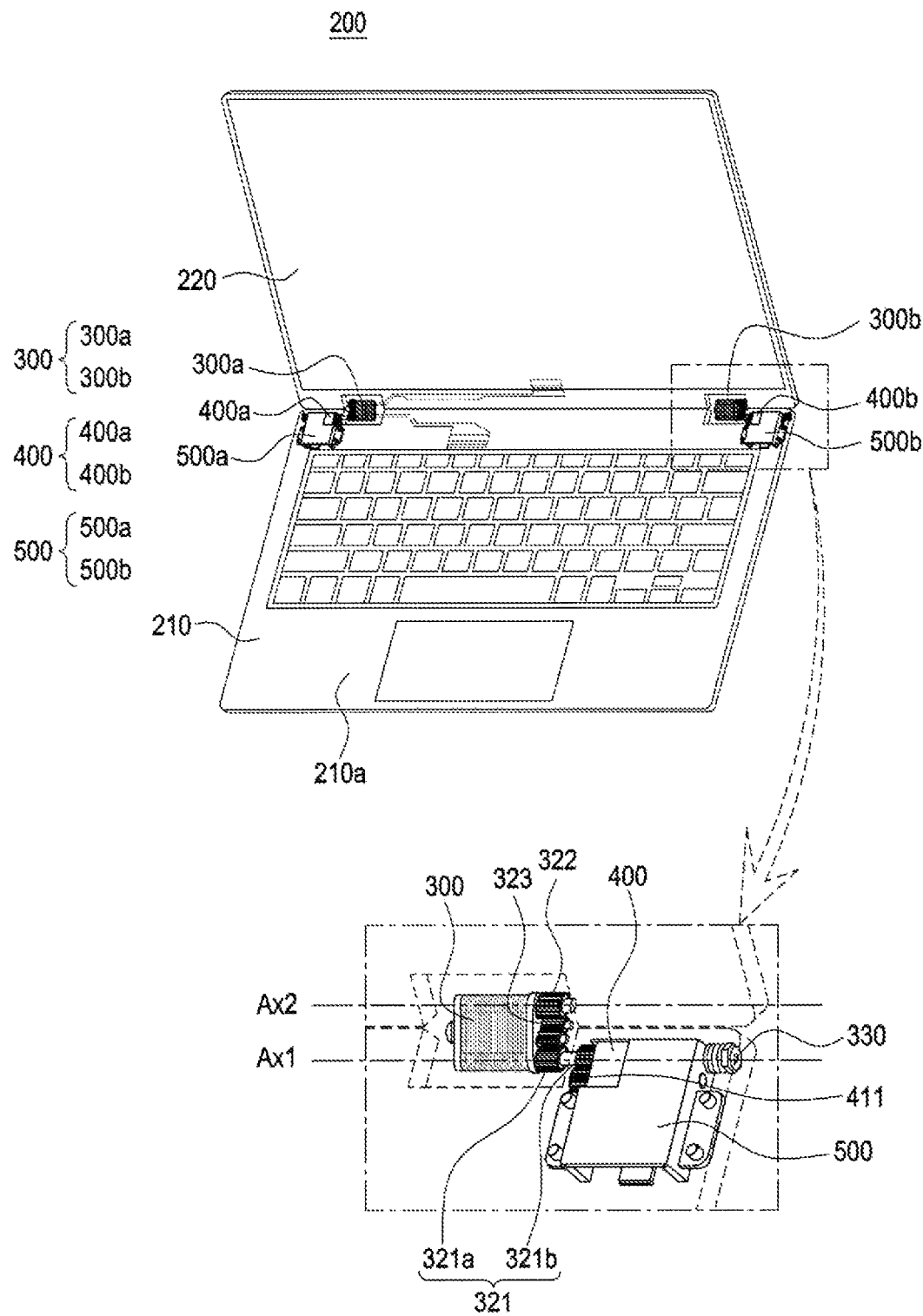
FIG. 4 and FIG. 5 are views illustrating the internal structure of an electronic device in a first state according to certain embodiments of the disclosure.
Figure 5:
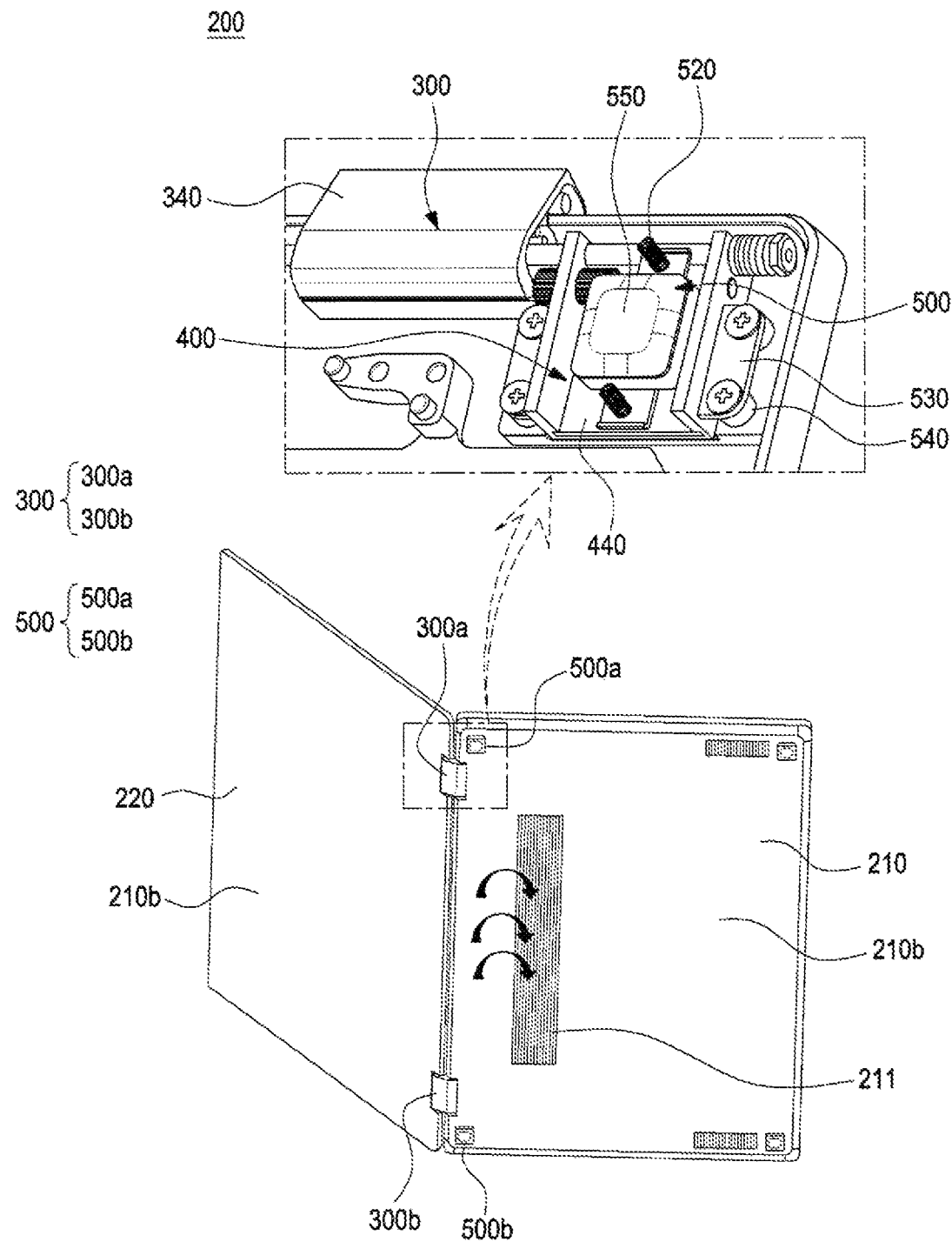

FIG. 4 and FIG. 5 are views illustrating the internal structure of an electronic device in a first state according to certain embodiments of the disclosure.

Referring to FIG. 4 and/or FIG. 5, an electronic device 200 may include a first housing 210, a second housing 220, a hinge module 300, a gear assembly 400, and a foot structure 500. The configuration of the first housing 210, the second housing 220, and the hinge module 300 of FIG. 4 and/or FIG. 5 may be entirely or partially the same as the configuration of the first housing 210, the second housing 220, and the hinge module 230 of FIG. 2 and/or FIG. 3.

According to certain embodiments, the first housing 210 may include at least one through-hole 211. According to an embodiment, the air inside the electronic device 200 may be discharged to the outside of the electronic device 200 through the through-hole 211. For example, air heated by a component (e.g., the processor 120 of FIG. 1) of the electronic device 200 may be delivered to the outside of the electronic device 200. According to an embodiment, the through-hole 211 may extend through the first front surface 210a and the first rear surface 210b of the first housing 210. According to an embodiment, the foot structure 500 may raise at least a part (e.g., the first housing 210) of the electronic device 200. According to an embodiment, when the distance between the first housing 210 and the ground is increased by the foot structure 500, the amount of air outside the electronic device 200, which is delivered to the through-hole 211, may be increased. According to an embodiment, the foot structure 500 may be interpreted as a thermal foot structure.

According to certain embodiments, the hinge module 300 may be configured to connect the first housing 210 and the second housing 220. For example, the hinge module 300 may include a first rotation gear 321 connected to the first housing 210 and a second rotation gear 322 connected to the second housing 220. According to an embodiment, the second rotation gear 322 may be connected to the second housing 220, and the first rotation gear 321 may be rotatably connected to the second rotation gear 322. According to an embodiment, the hinge module 300 may include multiple idle gears 323 rotatably connected to the first rotation gear 321 and the second rotation gear 322. According to an embodiment, the first rotation gear 321 may be configured to rotate around a first rotation axis Ax1. The second rotation gear 322 may be configured to rotate around a second rotation axis Ax2 substantially parallel to the first rotation axis Ax1. According to an embodiment, the first rotation gear 321 may include a (1-1)st rotation gear 321a configured to engage with the second rotation gear 322 and/or the idle gears 323, and (1-2)nd rotation gear 321b disposed parallel to the (1-1)st rotation gear 321a. According to an embodiment, the (1-2)nd rotation gear 321b may be configured to engage with at least a part (e.g., the pinion gear 410 of FIG. 6) of the gear assembly 400.

According to certain embodiments, the hinge module 300 may include a hinge shaft 330. According to an embodiment, the hinge shaft 330 may provide a force or pressure, which allows the first housing 210 to be maintained at a designated angle with respect to the second housing 220, to a rotation gear 310 and/or a shaft (the shaft 413 of FIG. 7). For example, the hinge shaft 330 may be interpreted as a detent structure. According to an embodiment, the hinge shaft 330 may be disposed in the first housing 210. According to an embodiment, the hinge shaft 330 may be disposed on substantially the same axis (e.g., the first rotation axis Ax1) as that of the first rotation gear 321.

According to certain embodiments, the hinge module 300 may include a hinge cover 340. According to an embodiment, the hinge cover 340 may be configured to surround at least a part of the rotation gear 310. According to an embodiment, the hinge cover 340 may have at least a part formed in a closed curve shape. According to an embodiment, at least a part of the hinge cover 340 may be visually exposed to the outside of the electronic device 200.

According to certain embodiments, the hinge module 300 may include multiple hinge modules 300a and 300b. For example, the hinge module 300 may include a first hinge module 300a and a second hinge module 300b that is disposed in a line with the first hinge module 300a.

According to certain embodiments, the gear assembly 400 may be configured to transmit a rotation force of the hinge module 300 to the foot structure 500. According to an embodiment, when the second housing 220 rotates with respect to the first housing 210, the rotation gear 310 of the hinge module 300 may rotate. The gear assembly 400 may be connected to the rotation gear 310, and may be configured to move based on rotation of the rotation gear 310. For example, the gear assembly 400 may include a pinion gear 410 rotatably connected to the second rotation gear 321b of the hinge module 300. According to an embodiment, based on a movement of the gear assembly 400, a force (or pressure) may be transmitted to the foot structure 500. For example, a part (e.g., the plate 440 of FIG. 6) of the gear assembly 400 may be configured to slide and move based on rotation of the pinion gear 410. Pressure may be transmitted to the foot structure 500 by a slide movement of the gear assembly 400. According to an embodiment, the gear assembly 400 may be disposed in the first housing 210.

According to certain embodiments, the gear assembly 400 may include multiple gear assemblies 400a and 400b. For example, the gear assembly 400 may include a first gear assembly 400a connected to the first hinge module 300a and a second gear assembly 400b connected to the second hinge module 300b. According to an embodiment, the first gear assembly 400a and the second gear assembly 400b may be arranged in a line.

According to certain embodiments, the foot structure 500 may be configured to reduce or prevent a slip of the electronic device 200. According to an embodiment, the foot structure 500 may have at least apart configured to protrude from the first housing 210. According to an embodiment, the foot structure 500 may include a support area 550 configured to be in contact with the outside (e.g., the ground) of the electronic device 200. The support area 550 may be configured to support the electronic device 200. According to an embodiment, the support area 550 may have a friction coefficient higher than that of the housing 202. For example, the support area 550 may include rubber or a polymer or the like with similar elastic and/or impact absorbing properties.

According to certain embodiments, the foot structure 500 may include a guide member 530 configured to surround at least a part (e.g., the plate 440) of the gear assembly 400. According to an embodiment, the guide member 530 may be configured to guide a movement of the plate 440.

According to certain embodiments, the foot structure 500 may be connected to the first housing 210. For example, the foot structure 500 may include at least one fastening member 540. The fastening member 540 may be connected to the first housing 210 and the guide member 530. According to an embodiment, the fastening member 540 may include a screw structure or a boss structure.

According to certain embodiments, the foot structure 500 may include multiple foot structures 500*a* and 500*b*. For example, the foot structure 500 may include a first foot structure 500*a* connected to the first gear assembly 400*a* and a second foot structure 500*b* connected to the second gear assembly 400*b*. According to an embodiment, the first foot structure 500*a* and the second foot structure 500*b* may be arranged in a line.

Figure 6:
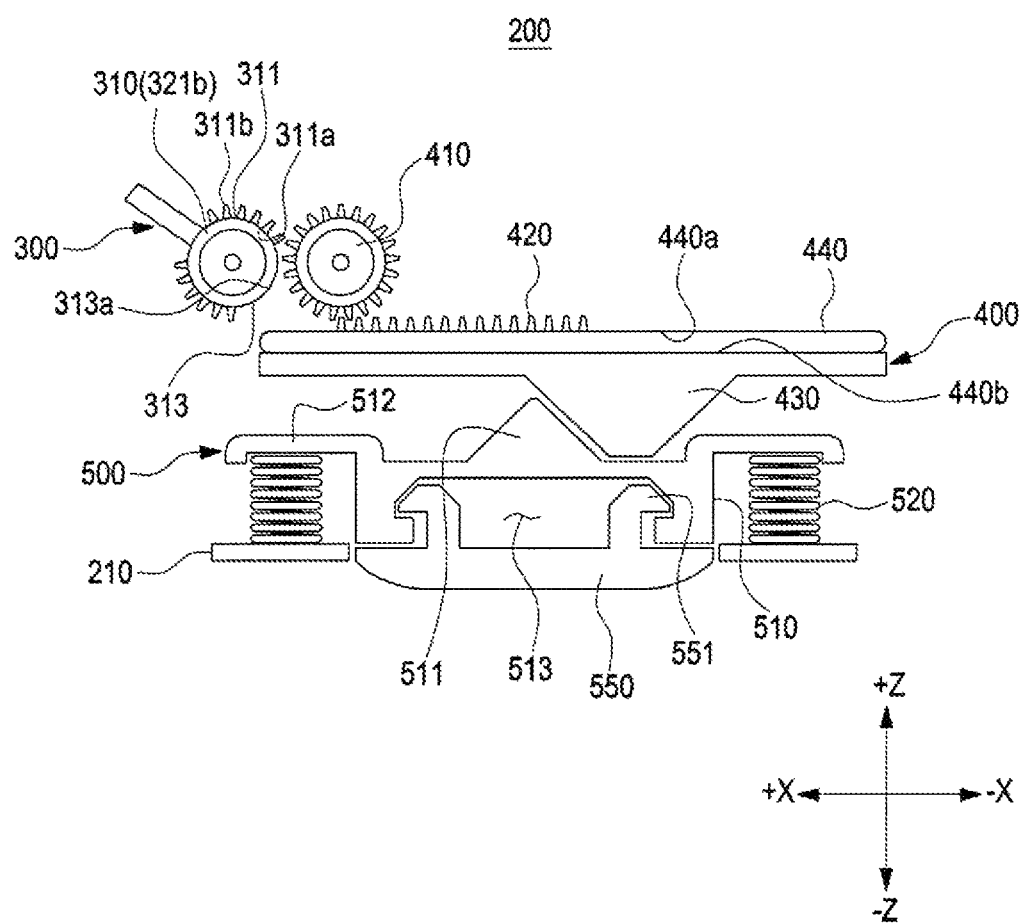
FIG. 6 is a schematic view of an electronic device according to certain embodiments of the disclosure.
Figure 7:
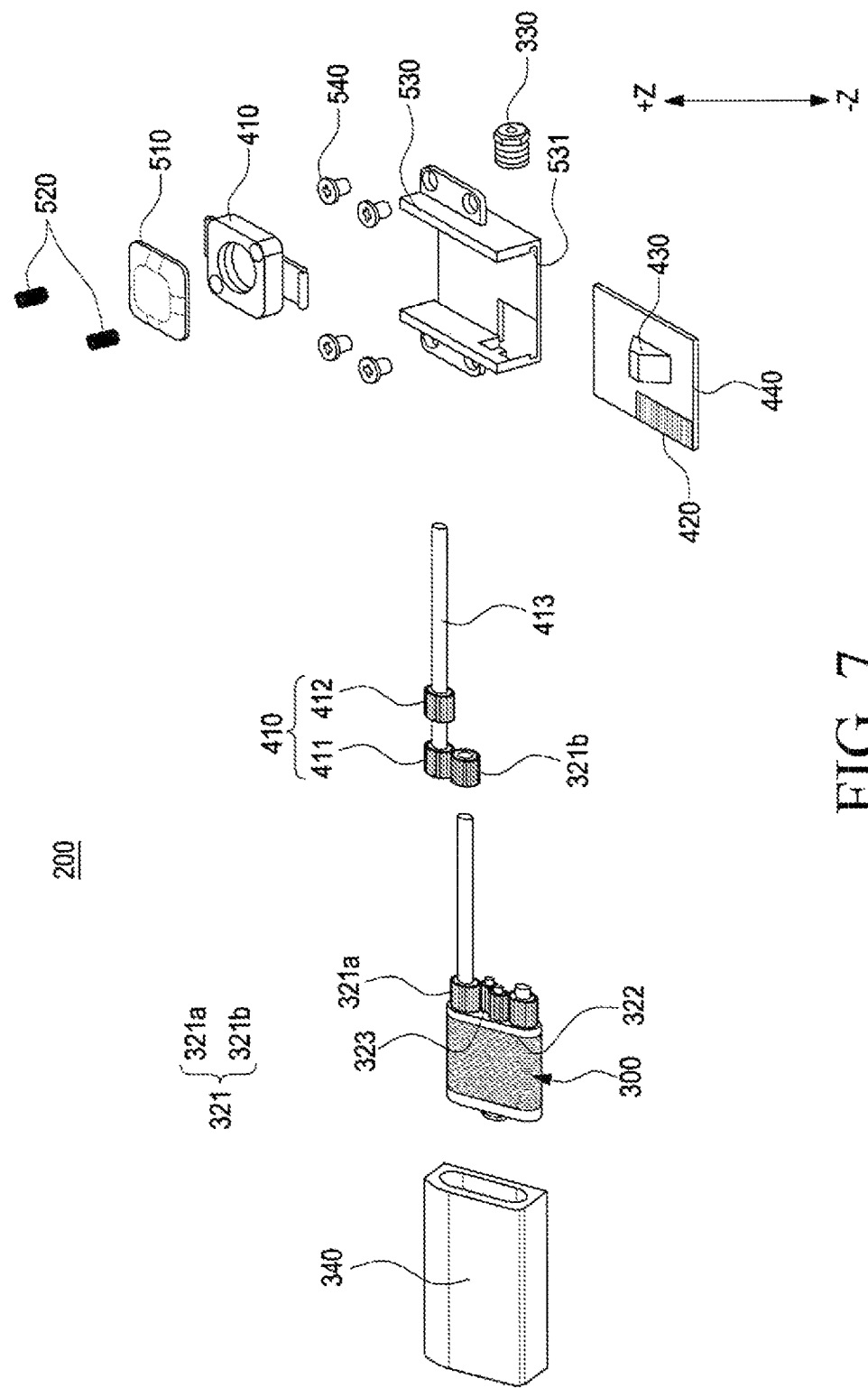
FIG. 7 is an exploded perspective view of a hinge module, a gear assembly, and a foot structure according to certain embodiments of the disclosure.
Figure 8A:
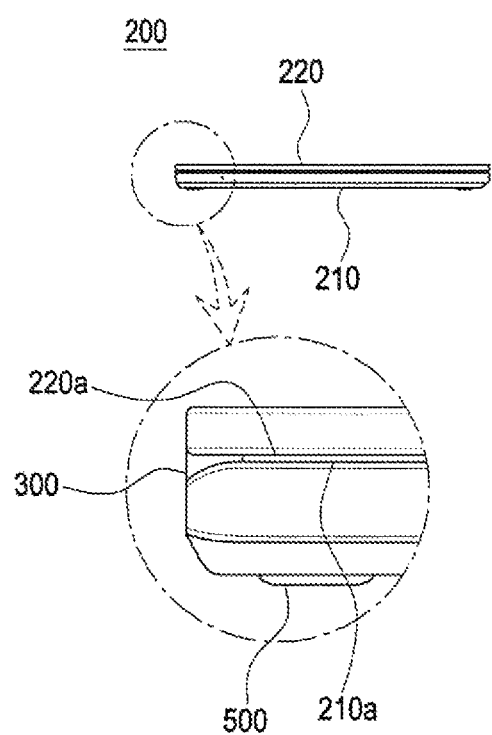
FIGS. 8A, 8B, 8C, 8D and 8E are views illustrating a foot structure configured to move based on an angle between a first housing and a second housing according to certain embodiments of the disclosure.
Figure 8B:
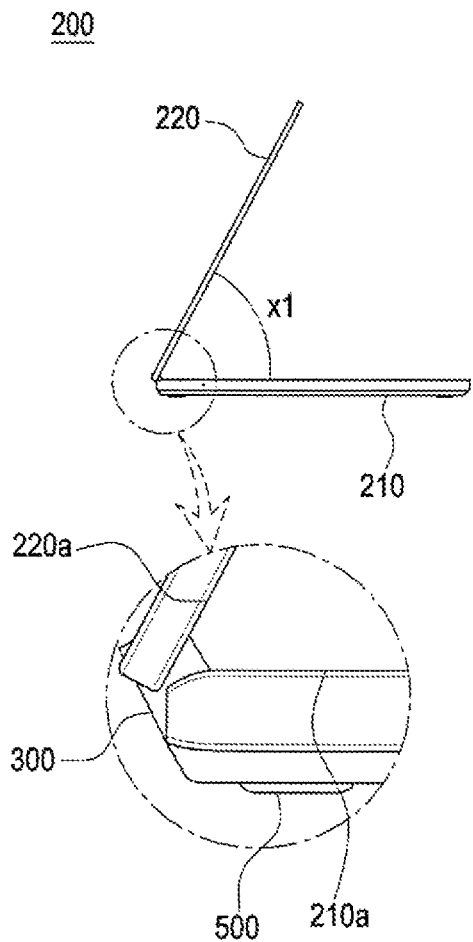
Figure 8C:
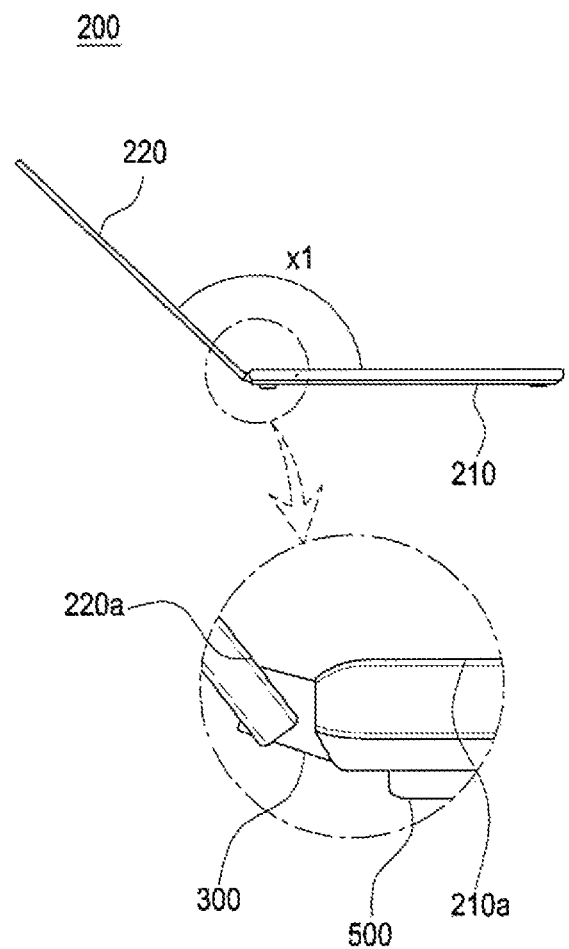
Figure 8D:
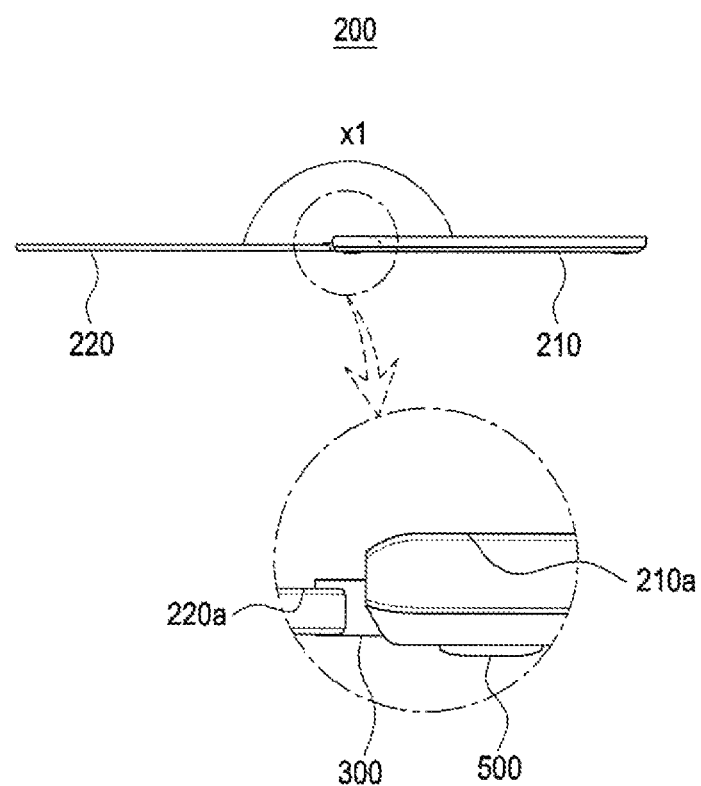
Figure 8E:
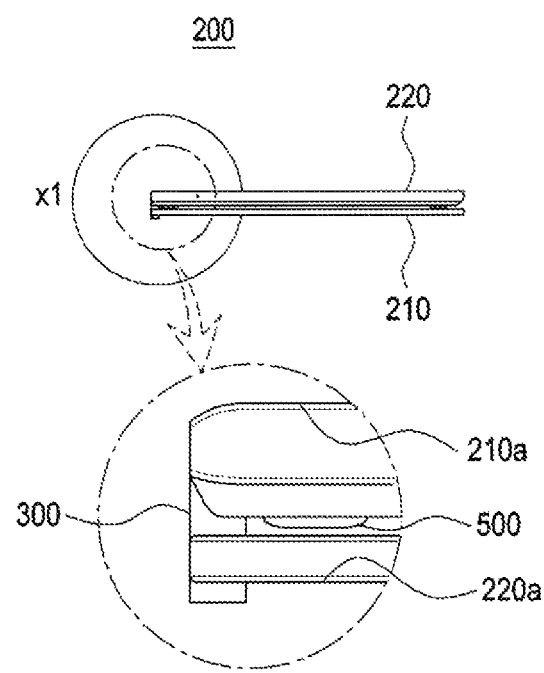

FIG. 6 is a schematic view of an electronic device according to certain embodiments of the disclosure. FIG. 7 is an exploded perspective view of a hinge module, a gear assembly, and a foot structure according to certain embodiments of the disclosure.

Referring to FIG. 6 and/or FIG. 7, an electronic device 200 may include a hinge module 300, a gear assembly 400, and a foot structure 500. The configuration of the hinge module 300, the gear assembly 400, and the foot structure 500 of FIG. 6 and/or FIG. 7 may be entirely or partially the same as the configuration of the hinge module 300, the gear assembly 400, and the foot structure 500 of FIG. 4 and/or FIG. 5.

According to certain embodiments, the hinge module 300 may include a first rotation gear 321, a second rotation gear 322, multiple idle gears 323, a hinge shaft 330, and a hinge cover 340. The configuration of the first rotation gear 321, the second rotation gear 322, the multiple idle gears 323, the hinge shaft 330 and the hinge cover 340 of FIG. 6 and/or FIG. 7 may be entirely or partially the same as the configuration of the first rotation gear 321, the second rotation gear 322, the multiple idle gears 323, the hinge shaft 330, and the hinge cover 340 of FIG. 4 and/or FIG. 5.

According to certain embodiments, the rotation gear 310 (e.g., the (1-2)nd rotation gear 321*b*) may include a first gear area 311 and a second gear area 313. According to an embodiment, the first gear area 311 may include a first curved-surface 311*a* and first gear teeth 311*b* configured to extend or protrude from the first curved-surface 311*a*. The second gear area 313 may include a second curved-surface 313*a* configured to extend from the first curved-surface 311*a*. For example, a portion of the rotation gear 310, in which gear teeth (e.g., the first gear teeth 311*b*) are not positioned, may be interpreted as the second gear area 313. According to an embodiment, the first curved-surface 311*a* and the second curved-surface 313*a* may form a substantially circular curved-surface. According to an embodiment, the first gear teeth 311*b* and the second curved-surface 313*a* may be configured to be visually exposed to the outside of the rotation gear 310.

According to certain embodiments, the rotation gear 310 (e.g., the second rotation gear 321*b*) may be formed as one gear area (not shown). For example, the first gear area 311 and the second gear area 313 of the rotation gear 310 may be integrally formed. According to certain embodiments, a pinion gear 410 may include a first pinion gear 411. According to an embodiment, the first pinion gear 411 may be configured to engage with the rotation gear 310 (e.g., the second gear 321*b*). For example, the first pinion gear 411 may be configured to rotate based on rotation of the rotation gear 310. According to an embodiment, when the first pinion gear 411 faces or contacts the first gear area 311, the first pinion gear 411 may be configured to receive torque transmitted from the rotation gear 310. For example, when the first pinion gear 411 faces or contacts the first gear area 311, based on a movement of a housing (e.g., the housing 202 of FIG. 1), the first pinion gear 411 may be configured to rotate. For example, when the rotation gear 310 rotates, the first pinion gear 411 may be configured to rotate in the reverse direction of the rotation direction of the rotation gear 310. According to an embodiment, when the first pinion gear 411 faces or contacts the second gear area 313, the first pinion gear 411 may be configured such that torque by rotation gear 310 is not transmitted thereto. For example, when the first pinion gear 411 faces or contacts the second gear area 313, the first pinion gear 411 may be configured not to rotate. For example, when the rotation gear 310 rotates, the first pinion gear 411 may be configured not to rotate.

According to certain embodiments, the pinion gear 410 may include a second pinion gear 412. According to an embodiment, the second pinion gear 412 may be configured to rotate around substantially the same axis as that of the first pinion gear 411. For example, the second pinion gear 412 may be connected to the first pinion gear 411 by using a shaft 413. According to an embodiment, when the first pinion gear 411 rotates, the second pinion gear 412 may be configured to rotate in the same direction as the first pinion gear 411. According to an embodiment, the second pinion gear 412 may be disposed parallel to the first pinion gear 411. According to an embodiment, the second pinion gear 412 may be configured to engage with a rack gear 420.

According to certain embodiments, the gear assembly 400 may include the rack gear 420. According to an embodiment, the rack gear 420 may be configured to engage with the pinion gear 410 (e.g., the second pinion gear 412). For example, the rack gear 420 may be configured to slide based on rotation of the pinion gear 410, e.g., the linear movement of the rack gear 420 may correspond to the rotation of the pinion gear 410 to which it is operatively engaged. For example, the rack gear 420 may be configured to slide and move in a first direction (e.g., the x-axis direction). According to an embodiment, when the pinion gear 410 (e.g., the first pinion gear 411) contacts the first gear area 311 of the rotation gear 310, the rack gear 420 may be configured to move based on rotation of the rotation gear 310. According to an embodiment, when the pinion gear 410 (e.g., the first pinion gear 411) faces the second gear area 313 of the rotation gear 310, the rack gear 420 may be configured not to move even though the rotation gear 310 rotates. According to an embodiment (not shown), the rack gear 420 may be formed in a track shape. For example, the rack gear 420 may be formed in a caterpillar track shape.

According to certain embodiments, the gear assembly 400 may include a plate 440. According to an embodiment, the plate 440 may include a first surface 440*a* and a second surface 440*b* opposite to the first surface 440*a*. According to an embodiment, the rack gear 420 may be positioned above (e.g., the +Z-direction) the plate 440. For example, the rack gear 420 may be positioned on the first surface 440*a* of the plate 440. As another example, the rack gear 420 may be integrally formed with the plate 440, and may be a portion of the plate 440, which protrudes from the first surface 440*a* of the plate 440 in a second direction (e.g., the +Z-direction).

According to certain embodiments, the gear assembly 400 may include a cam structure 430. According to an embodiment, the cam structure 430 may be connected to the rack gear 420 and/or the plate 440. For example, the cam structure 430 may be configured to slide and move based on rotation of the pinion gear 410 in the first direction (the x-axis direction) together with the rack gear 420 and/or plate 440. According to an embodiment, the cam structure 430 may be positioned below (e.g., the −Z-direction) the plate

440. For example, the cam structure 430 may be disposed on the second surface 440b of the plate 440. As another example, the cam structure 430 may be a portion of the plate 440, which protrudes from the second surface 440b of the plate 440 in a third direction (the −Z-direction).

According to certain embodiments, the cam structure 430 may be configured to transmit a pressure or force to the foot structure 500. For example, the cam structure 430 may be configured to face or touch at least a part (e.g., the protruding area 511) of the foot structure 500. According to an embodiment, when the rack gear 420 and/or the cam structure 430 slide and move in the first direction, the cam structure 430 may be configured to transmit a force to the protruding area 511 in a second direction (the +Z-direction) or the third direction (the −Z-direction). According to an embodiment, a lubricating material (e.g., a lubricating oil and/or a lubricating agent) may be placed between the cam structure 430 and the protruding area 511. The lubricating material may have a friction coefficient lower than the friction coefficient of the cam structure 430 and/or the protruding area 511 such that the lubricating material reduces the friction between the parts.

According to certain embodiments, the foot structure 500 may be configured to adjust a height of the electronic device 200. According to an embodiment, based on the force or pressure transmitted from the cam structure 430, the foot structure 500 may be configured to move in the second direction (the +Z-direction) or the third direction (the −Z-direction) with respect to the first housing 210. According to an embodiment, as the distance between the first rear surface 210b of the first housing 210 and a space (e.g., the ground) in which the electronic device 200 is seated, the heat dissipation effect of the electronic device 200 may be increased.

According to certain embodiments, the foot structure 500 may include an elastic member 520, a guide member 530, and a fastening member 540. The configuration of the elastic member 520, the guide member 530, and the fastening member 540 of FIG. 6 and/or FIG. 7 may be entirely or partially the same as the configuration of the elastic member 520, the guide member 530, and the fastening member 540 of FIG. 4 and/or FIG. 5.

According to certain embodiments, the foot structure 500 may include a foot structure holder 510. According to an embodiment, the foot structure holder 510 may include a protruding area 511 configured to face at least a part of the cam structure 430. According to an embodiment, the protruding area 511 may be configured to receive the force or pressure transmitted from the cam structure 430. For example, based on a sliding movement of the cam structure 430, the protruding area 511 may be configured to receive a force in the third direction (the −Z-direction). According to an embodiment, the protruding area 511 may include a third inclined surface 511a, a fourth inclined surface 511b, and a second flat surface 511c positioned between the third inclined surface 511a and the fourth inclined surface 511b.

According to certain embodiments, the foot structure holder 510 may include a wing part 512 configured to face the elastic member 520. According to an embodiment, the wing part 512 may be configured to extend in the first direction (e.g., the x-axis direction) from the protruding area 511. According to an embodiment, the wing part 512 may be formed integrally with the protruding area 511. According to an embodiment, the wing part 512 may be configured to receive an elastic force in the second direction (the +Z-direction) from the elastic member 520.

According to certain embodiments, the foot structure holder 510 may include an accommodation area 513. According to an embodiment, the accommodation area 513 may be configured to accommodate at least a part of the support area 550. According to an embodiment, the accommodation area 513 may be interpreted as an empty space or a groove formed below (e.g., the −Z-direction) of the foot structure holder 510.

According to certain embodiments, the foot structure 500 may include the elastic member 520. According to an embodiment, the elastic member 520 may be disposed between the first housing 210 and the wing part 512. For example, the elastic member 520 may be connected to the first housing 210 and the wing part 512. According to an embodiment, the elastic member 520 may be compressed by the force or pressure transmitted from the cam structure 430 of the gear assembly 400. The elastic member 520 may be formed of a material having elastic properties (e.g., a rubber or rubber-like material). For example, when the protruding area 511 of the foot structure 500 receives a force or pressure by the cam structure 430, the elastic member 520 may be compressed, and the foot structure holder 510 and/or the support area 550 may be moved in the third direction (the −Z-direction). According to an embodiment, when the cam structure 430 of the gear assembly 400 is spaced apart from the protruding area 511 of the foot structure 500, the elastic member 520 may be configured to provide an elastic force to the foot structure holder 510 in the second direction (the +Z-direction). The foot structure holder 510 and/or the support area 550 may be configured to move in the second direction (the +Z-direction). According to an embodiment, due to the sliding movement of the cam structure 430, when the force transmitted in the third direction −Z with respect to the foot structure holder 510 is greater than the elastic force transmitted from the elastic member 520 to the foot structure holder 510, the cam structure 430 may be configured to move with respect to the foot structure holder 510. According to an embodiment, to reduce the user's force required for rotation of the electronic device 200, the elastic member 520 may be designed to have an elastic force smaller than a designated value.

According to certain embodiments, the foot structure 500 may include a guide member 530. According to an embodiment, the guide member 530 may include an accommodation groove 531. According to an embodiment, the accommodation groove 531 may be configured to accommodate at least a part (e.g., the rack gear 420 and/or the plate 440) of the gear assembly 400. According to an embodiment, the accommodation groove 531 may be configured to guide a movement of the plate 440 in the first direction (the x-axis direction). For example, the accommodation groove 531 may be a groove formed on the inner surface of the guide member 530 along the first direction (the x-axis direction). According to an embodiment, the guide member 530 may be connected or fixed or otherwise coupled to the first housing 210 by using at least one fastening member 540.

According to certain embodiments, the foot structure 500 may include the support area 550. According to an embodiment, the support area 550 may be fastened to the foot structure holder 510. For example, the support area 550 may include a hook structure 551. The hook structure 551 may be fastened to the inner surface of the accommodation area 513. According to an embodiment, the support area 550 may be configured to be interference fit to the foot structure holder 510. According to an embodiment, the support area 550 may include an elastic body (e.g., rubber).

Figure 9:
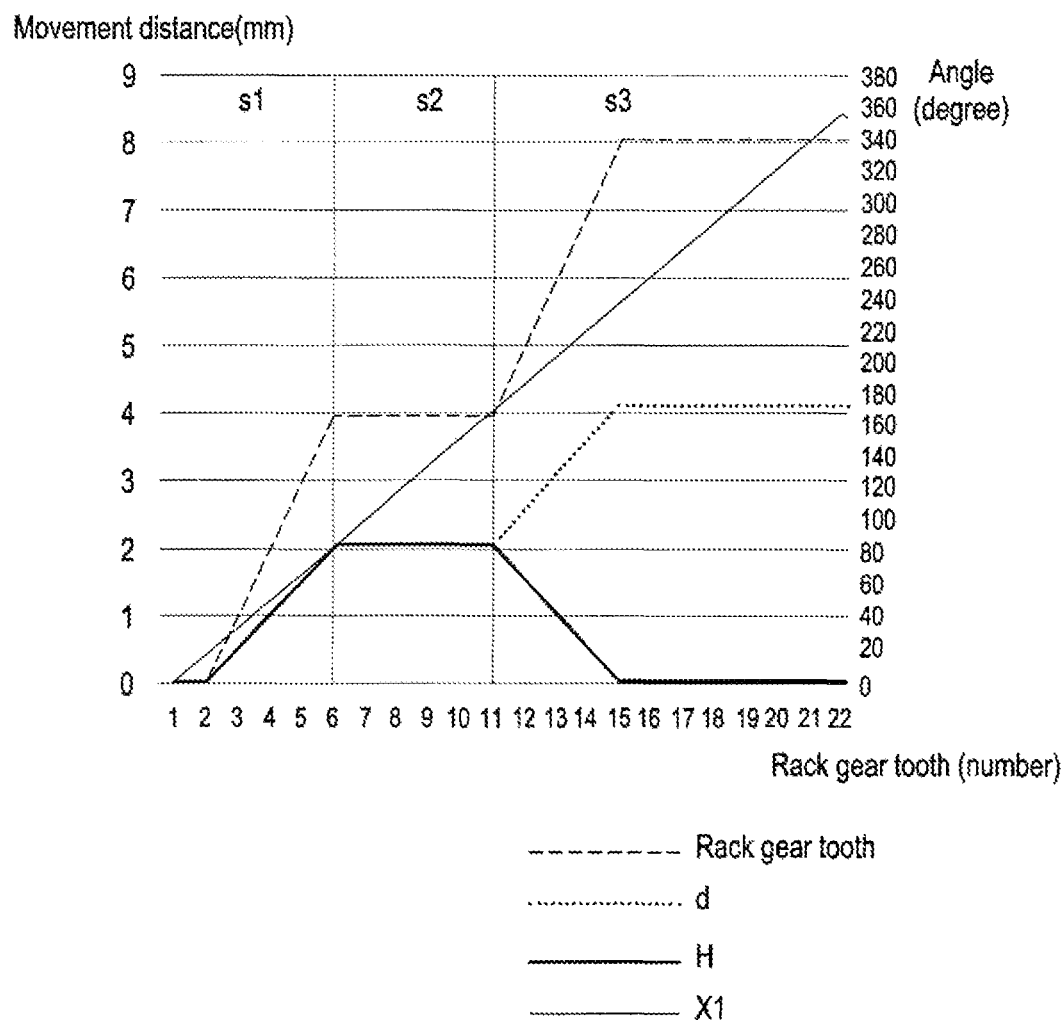
FIG. 9 is a graph showing a relationship between an angle of an electronic device and a height of a foot structure according to certain embodiments of the disclosure.
Figure 10:
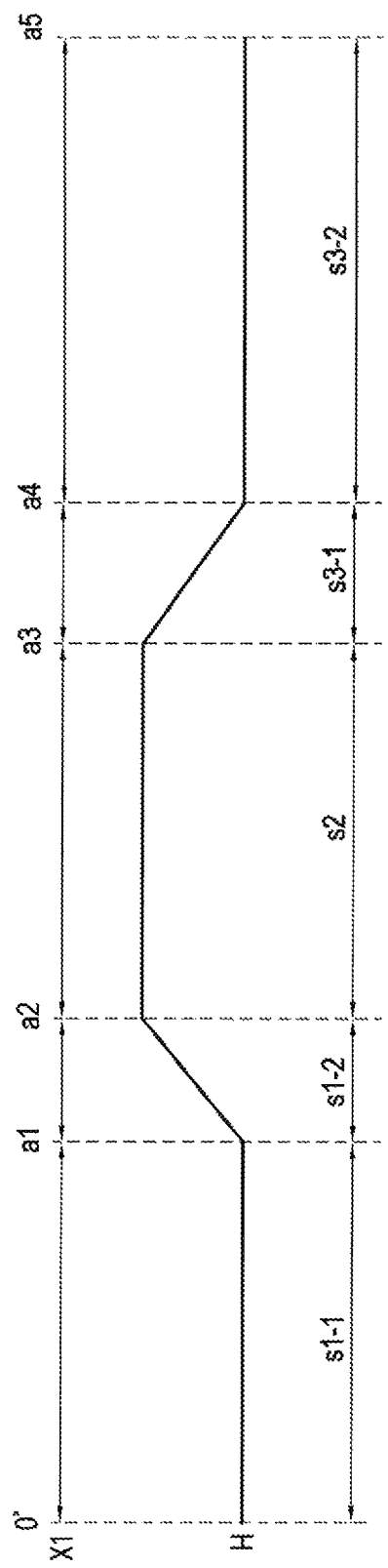
FIG. 10 is a view showing an operation, based on an angle of an electronic device, of a foot structure and a gear assembly according to certain embodiments of the disclosure.
Figure 11A:
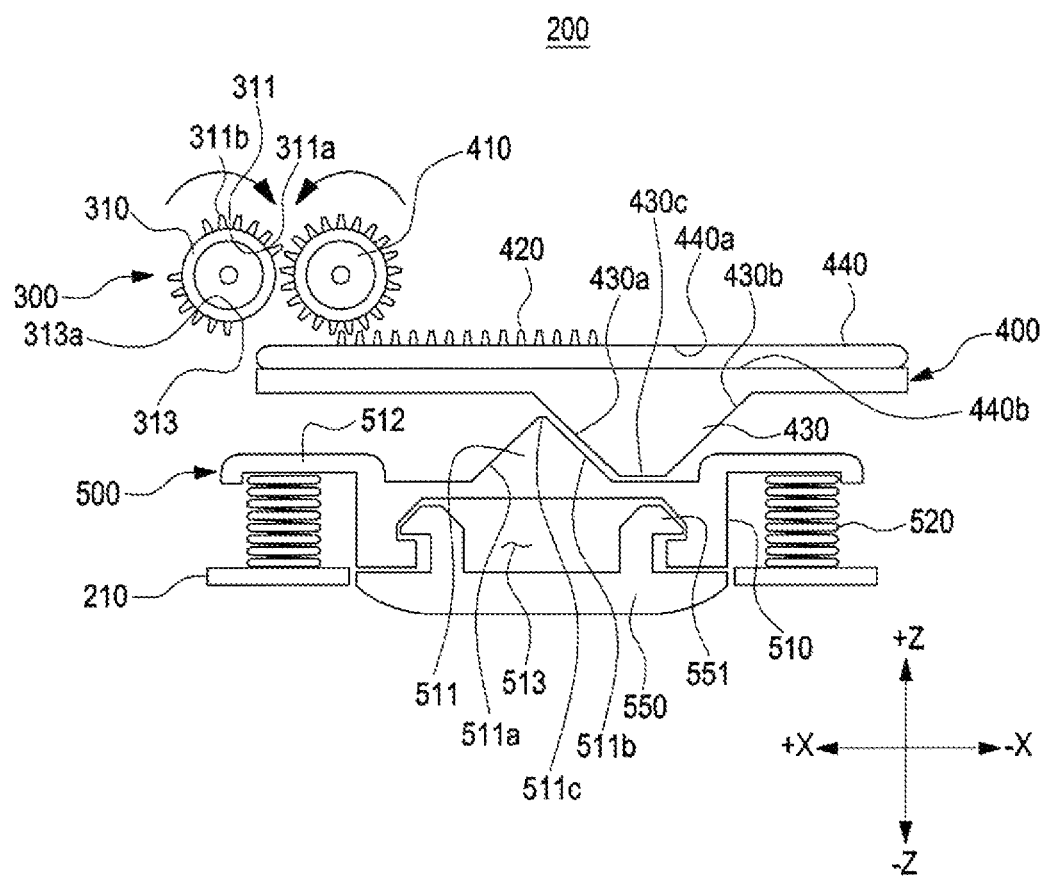
FIGS. 11A, 11B, 11C, 11D and 11E are schematic views of a hinge module, a gear assembly, and a foot structure of an electronic device, which move based on an angle of the electronic device according to certain embodiments of the disclosure.
Figure 11B:
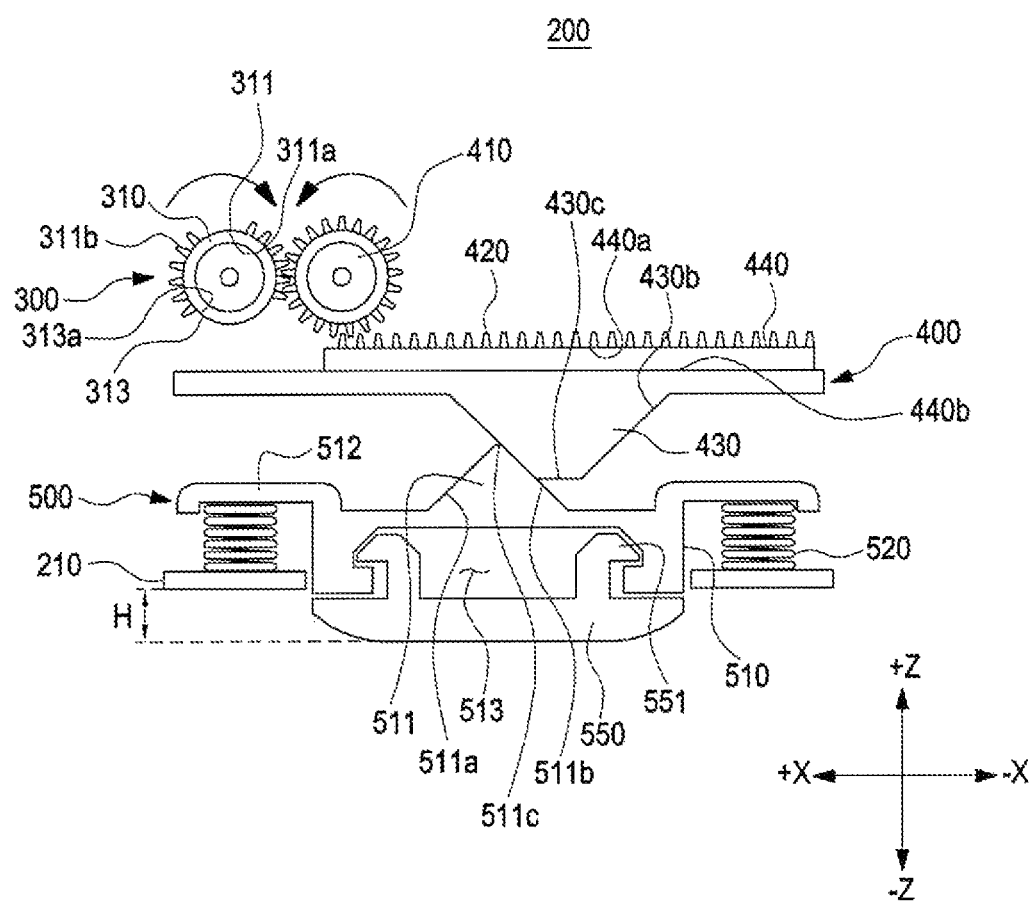
Figure 11C:
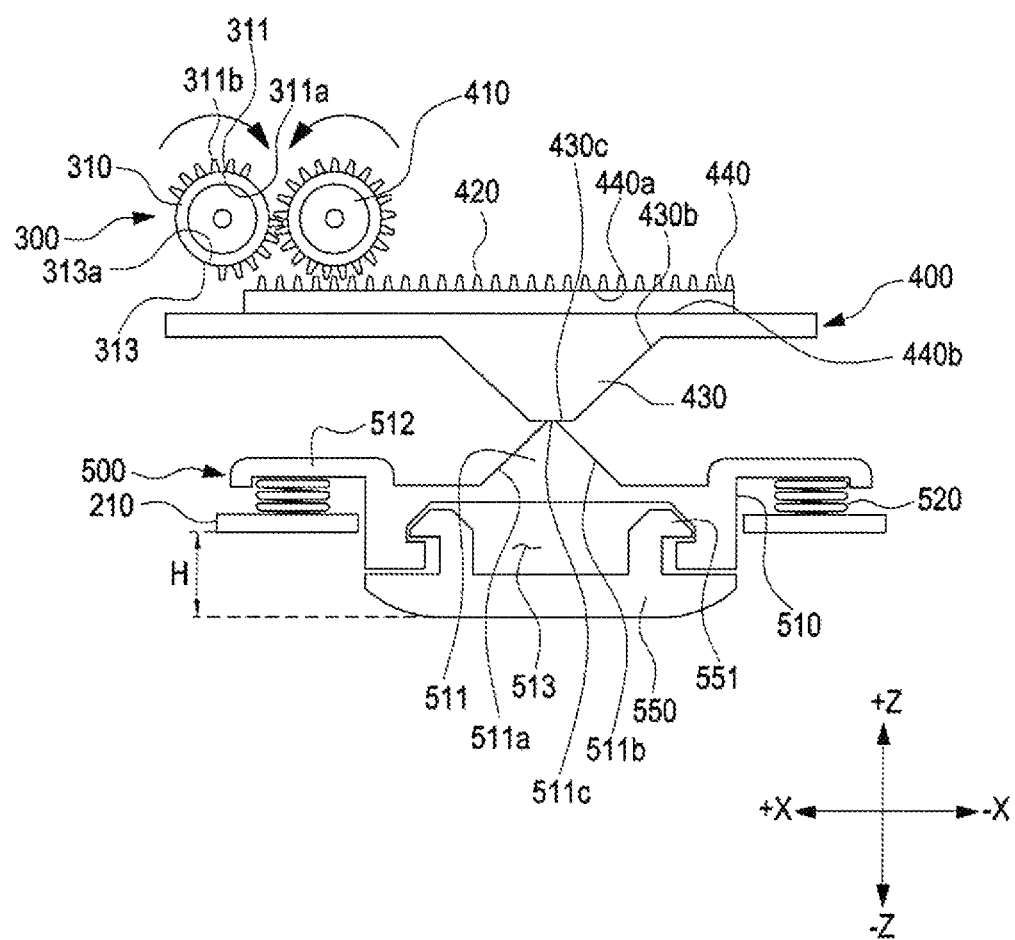
Figure 11D:
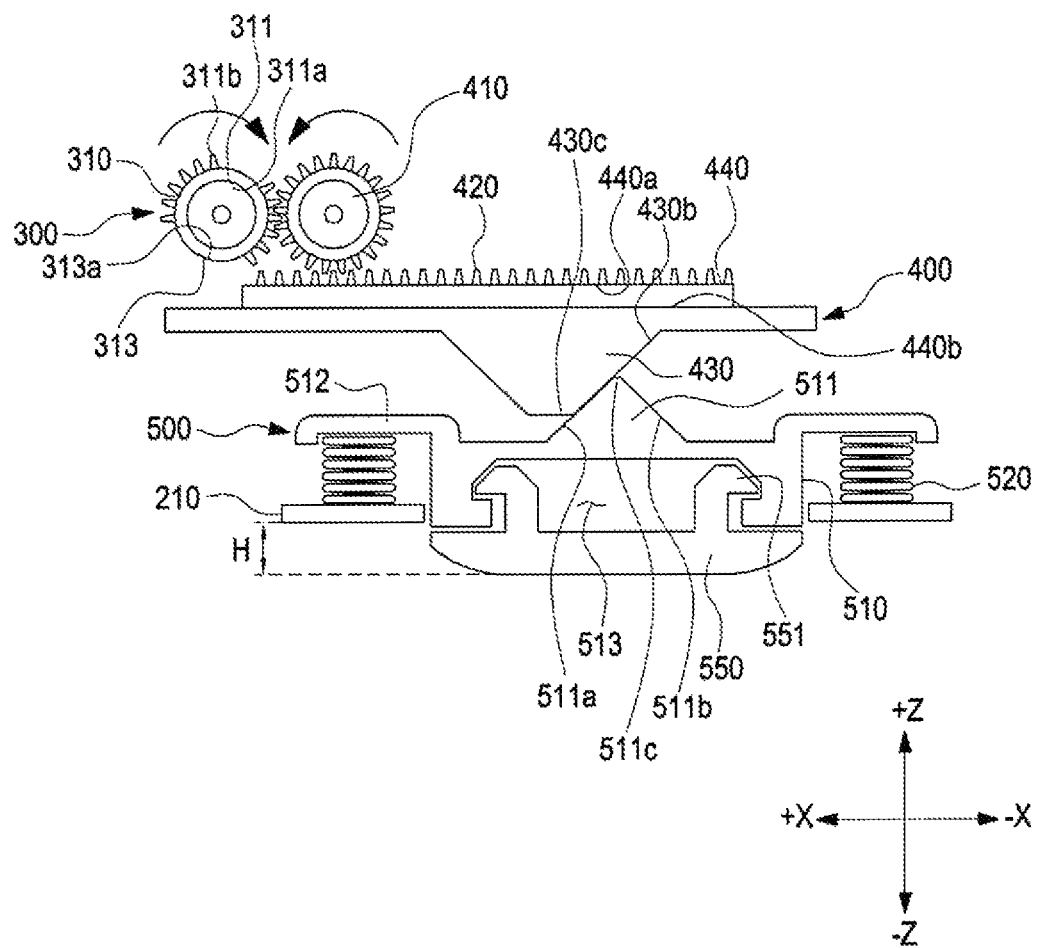
Figure 11E:
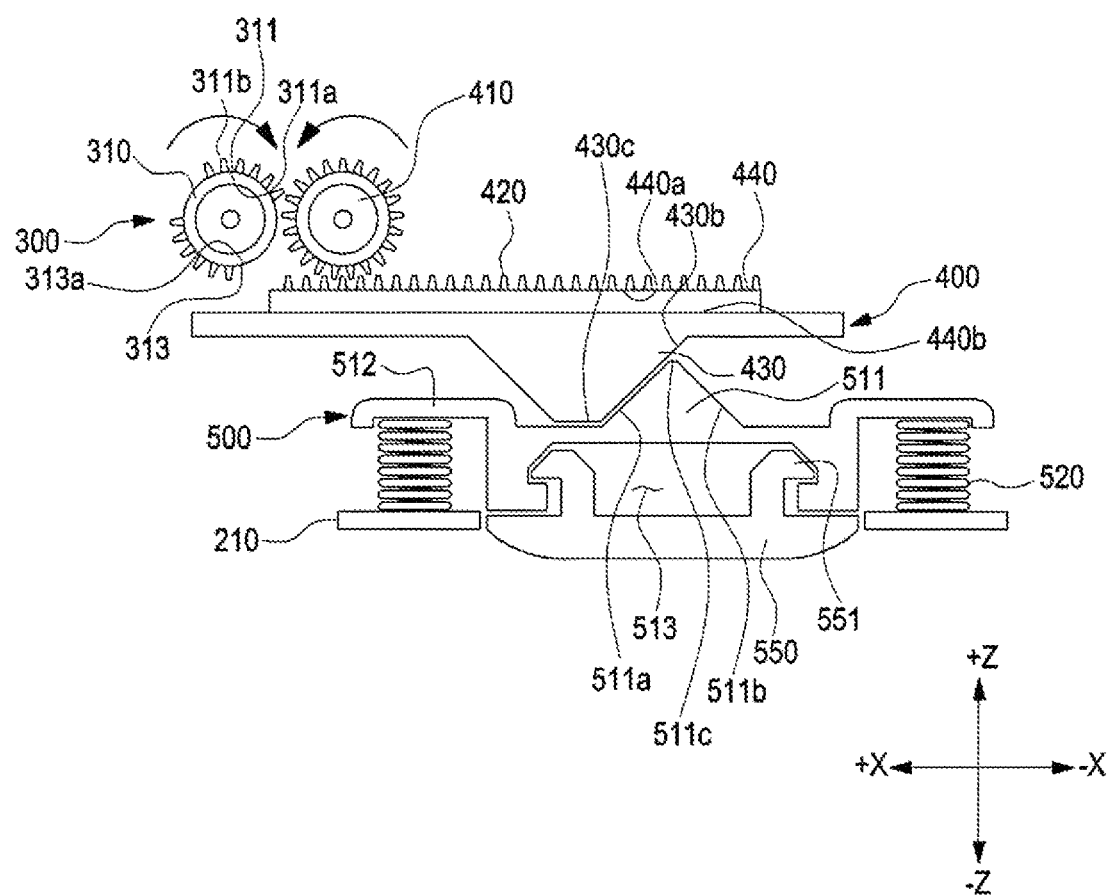

FIG. 8A to FIG. 8E are views illustrating a foot structure configured to move based on an angle between a first housing and a second housing according to certain embodiments of the disclosure. FIG. 9 is a graph showing a relationship between an angle of an electronic device and a height of a foot structure according to certain embodiments of the disclosure. FIG. 10 is a view showing an operation, based on an angle of an electronic device, of a foot structure and a gear assembly according to certain embodiments of the disclosure. FIG. 11A to FIG. 11E are schematic views of a hinge module, a gear assembly, and a foot structure of an electronic device, which move based on an angle of the electronic device according to certain embodiments of the disclosure.

Referring to FIG. 8A to FIG. 11E, an electronic device 200 may include a first housing 210, a second housing 220, a hinge module 300, a gear assembly 400, and/or a foot structure 500. The configuration of the first housing 210, the second housing 220, and the foot structure 500 of FIG. 8A to FIG. 8E may be entirely or partially the same as the configuration of the first housing 210, the second housing 220, and the foot structure 500 of FIG. 5. The configuration of the hinge module 300, the gear assembly 400, and/or the foot structure 500 of FIG. 10 and FIG. 11A to FIG. 11E may be entirely or partially the same as the configuration of the hinge module 300, the gear assembly 400, and/or the foot structure 500 of FIG. 6.

According to certain embodiments, the first housing 210 may be configured to rotate with respect to the second housing 220. For example, a first angle x1 between the first housing 210 and the second housing 220 may be changed to about 0 degree to about 360 degrees. According to an embodiment, the first angle x1 may be interpreted as an angle between a first front surface 210a of the first housing 210 and a second front surface 220a of the second housing 220.

According to certain embodiments, the foot structure 500 may be configured to move based on rotation of the second housing 220 with respect to the first housing 210. For example, a first distance d, in which the rack gear 420 moves, may be changed based on a rotation angle of the hinge module 300 and/or the first angle X1 between the first housing 210 and the second housing.

According to certain embodiments, the foot structure 500 may be configured to move based on rotation of the second housing 220 with respect to the first housing 210. For example, a second distance H, in which the foot structure 500 moves, may be changed based on a rotation angle of the hinge module 300 and/or the first angle X1 between the first housing 210 and the second housing. For example, the rack gear 420 may be configured to move by the first distance d, based on the first angle X1, and the foot structure 500, which receives a force or pressure by the rack gear 420, may be configured to move by the second distance H.

According to certain embodiments, the rack gear 420 and/or the foot structure 500 may be configured to move differently for each section. For example, based on rotation of the second housing 220 with respect to the first housing 210, the first angle X1 may be substantially linearly changed, but the rack gear 420 engaged with the teeth of the pinion gear 410 may be non-linearly changed.

According to certain embodiments, in a first section s1, the pinion gear 410 may be configured to engage with the first gear area 311 of the rotation gear 310. For example, in the first section s1, the pinion gear 410 may be configured to rotate in a direction reverse to the direction in which the rotation gear 310 rotates. The rack gear 420 may be configured to move by the pinion gear 410, and the foot structure 500 may be configured to receive a pressure transmitted from the cam structure 430 connected to the rack gear 420 and to move below the first housing 210. According to an embodiment, the first section s1 may include a (1-1)st section s1-1 in which the cam structure 430 and a protruding area 511 are spaced apart from each other, and a (1-2)nd section s1-2 in which the cam structure 430 and the protruding area 511 are in contact with each other. According to an embodiment (e.g., FIG. 8A and FIG. 11A), in the (1-1)st section s1-1, a fourth inclined surface 511b of the protruding area 511 may be configured to be spaced apart from a first inclined surface 430a of the cam structure 430 so as to receive no pressure. According to an embodiment (e.g., FIG. 8b and FIG. 11B), in the (1-2)nd section s1-2, the fourth inclined surface 511b of the protruding area 511 may be configured to touch the first inclined surface 430a of the cam structure 430, and the protruding area 511 may be configured to receive pressure provided from the cam structure 430. According to an embodiment, the (1-1)st section s1-1 may be a section in which the first angle X1 is 0 degree to a first hinge angle a1, and the (1-2)nd section s1-2 may be interpreted as a section in which the first angle X1 is the first hinge angle a1to a second hinge angle a2. The second hinge angle a2 may be greater than the first hinge angle a1. According to an embodiment, the first hinge angle a1 may be 17 degrees, and the second hinge angle a2 may be 86 degrees.

According to certain embodiments, in the second section s2, the pinion gear 410 may be configured not to engage with the rotation gear 310. For example, the pinion gear 410 may be configured to face the second gear area 313 of the rotation gear 310. According to an embodiment, in the second section s2, the first distance d and the second distance H may be maintained to have a substantially the same size. For example, in the second section s2, the second distance H may be about 2 mm. According to an embodiment (e.g., FIG. 8C and FIG. 11C), in the second section s2, a second flat surface 511c of the protruding area 511 may be configured to face a first flat surface 430c of the cam structure 430. According to an embodiment, the second section s2 may be interpreted as a section in which the first angle X1 is the second hinge angle a2 to a third hinge angle a3. The third hinge angle a3 may be greater than the second hinge angle a2. According to an embodiment, the third hinge angle a3 may be about 171 degrees.

According to certain embodiments, in a third section s3, the pinion gear 410 may be configured to engage with the first gear area 311 of the rotation gear 310. For example, in the third section s3, the pinion gear 410 may be configured to rotate in a direction reverse to the direction in which the rotation gear 310 rotates. The rack gear 420 may be configured to move by the pinion gear 410, and the foot structure 500 may be configured to receive pressure transmitted from the cam structure 430 connected to the rack gear 420 and thus to move toward the first housing 210. According to an embodiment, the third section s3 may include a (3-1)st section s3-1 in which the cam structure 430 and a protruding area 511 are in contact with each other, and a (3-2)nd section s3-2 in which the cam structure 430 and the protruding area 511 are spaced apart from each other. According to an embodiment (e.g., FIG. 8D and FIG. 11D), in the (3-1)st section s3-1, the third inclined surface 511a of the protruding area 511 may be configured to touch a second inclined surface 430b of the cam structure 430, and the protruding area 511 may be configured to receive pressure provided from the cam structure 430. According to an embodiment (e.g., FIG. 8E and FIG. 11E), in the (3-2)nd section s3-2, the third inclined surface 511a of the protruding area 511 may be configured to be spaced apart from the second inclined surface 430b of the cam structure 430 such that it receives no pressure. According to an embodiment, the (3-1)st section s3-1 may be a section in which the first angle X1 is the third hinge angle a3 to a fourth hinge angle a4, and the (3-2)nd section s3-2 may be interpreted as a section in which the first angle X1 is the fourth hinge angle a4 to a firth hinge angle a5. The fifth hinge angle a5 may be greater than the fourth hinge angle a4, and the fourth hinge angle a4 may be greater than the third hinge angle a3. According to an embodiment, the fourth hinge angle a4 may be about 223 degrees, and the fifth hinge angle a5 may be about 360 degrees.

According to certain embodiments of the disclosure, an electronic device (e.g., the electronic device 200 of FIG. 2) may include a housing (e.g., the housing 202 of FIG. 2) including a first housing (e.g., the first housing 210 of FIG. 2) and a second housing (e.g., the second housing 220 of FIG. 2) configured to rotate with respect to the first housing, a hinge module (e.g., the hinge module 230 of FIG. 2) which is connected to the first housing and the second housing and includes a rotation gear (e.g., the rotation gear 310 of FIG. 6), a gear assembly (e.g., the gear assembly 400 of FIG. 6) including a pinion gear (e.g., the pinion gear 410 of FIG. 6) rotatably connected to the rotation gear, a rack gear (e.g., the rack gear 420 of FIG. 6) configured to slide in a first direction (e.g., the first direction (the x-axis direction) of FIG. 6), based on rotation of the pinion gear, and a cam structure (e.g., the cam structure 430 of FIG. 6) connected to the rack gear, and a foot structure (e.g., the foot structure 500 of FIG. 6) connected to the first housing and configured to move in a second direction (e.g., the second direction (the +Z-direction) of FIG. 6) or a third direction (e.g., the third direction (the −Z-direction) of FIG. 6) perpendicular to the first direction, based on a movement of the cam structure.

According to certain embodiments, the foot structure may include a foot structure holder (e.g., the foot structure holder 510 of FIG. 6) including a protruding area (e.g., the protruding area 511 of FIG. 6) configured to face at least a part of the gear assembly and be in contact with the cam structure.

According to certain embodiments, the rotation gear may include a first gear area (e.g., the first gear area 311 of FIG. 6) including a first curved-surface (e.g., the first curved-surface 311a of FIG. 6) and a first gear tooth (e.g., the first gear teeth 311b of FIG. 6) configured to protrude from the first curved-surface, and a second gear area (e.g., the second gear area 313 of FIG. 6) including a second curved-surface (e.g., the second curved-surface 313a of FIG. 6) configured to extend from the first curved-surface and be exposed to the outside of the rotation gear.

According to certain embodiments, the first housing may be configured to rotate with respect to the second housing when the pinion gear corresponds to the first gear area, and the foot structure may be configured to move when the pinion gear corresponds to the first gear area.

According to certain embodiments, the first housing may include a first front surface (e.g., the first front surface 210a of FIG. 2) and a first rear surface (e.g., the first rear surface 210b of FIG. 2) opposite to the first front surface, the second housing may include a second front surface (e.g., the second front surface 220a of FIG. 2) and a second rear surface (e.g., the second rear surface 220b of FIG. 5) opposite to the second front surface, and based on rotation of the second housing with respect to the first housing, the first front surface may be configured to face the second front surface and the first rear surface may be configured to face the second rear surface.

According to certain embodiments, the hinge module may include a first rotation gear (e.g., the first rotation gear 321 of FIG. 7) connected to the first housing, a second rotation gear (e.g., the second rotation gear 322 of FIG. 7) connected to the second housing, and multiple idle gears (e.g., the idle gears 323 of FIG. 7) connected to the first rotation gear and the second rotation gear.

According to certain embodiments, the pinion gear may include a first pinion gear (e.g., the first pinion gear 411 of FIG. 7) configured to engage with the first rotation gear, and a second pinion gear (e.g., the second pinion gear 412 of FIG. 7) configured to engage with the first pinion gear and the rack gear.

According to certain embodiments, the electronic device may further include an input device (e.g., the input device 206 of FIG. 2) accommodated in the first housing, and a touch pad (e.g., the touch pad 208 of the FIG. 2) accommodated in the first housing.

According to certain embodiments, the electronic device may further include a display (e.g., the display 204 of FIG. 2) accommodated in the second housing.

According to certain embodiments, the gear assembly may include a plate (e.g., the plate 440 of FIG. 6) connected to the rack gear, and the foot structure may include a guide member (e.g., the guide member 530 of FIG. 7) including an accommodation groove (e.g., the accommodation groove 531 of FIG. 7) configured to guide a movement of the plate.

According to certain embodiments, the foot structure may include at least one fastening member (e.g., the fastening member 540 of FIG. 7) connected to the guide member and the first housing.

According to certain embodiments, the plate may include a first surface (e.g., the first surface 440a of FIG. 6) and a second surface (e.g., the second surface 400b of FIG. 6) opposite to the first surface, the rack gear may be disposed on the first surface, and the cam structure may be disposed on the second surface.

According to certain embodiments, the foot structure may include a wing part (e.g., the wing part 512 of FIG. 6) which is configured to extend from a protruding area (e.g., the protruding area 511 of FIG. 6) configured to be in contact with the cam structure, and at least one elastic member (e.g., the elastic member 520 of FIG. 6) disposed between the wing part and the first housing.

According to certain embodiments, the foot structure may include a support area (e.g., the support area 550 of FIG. 6) which is configured to be exposed to the outside of the electronic device and includes an elastic material, e.g., a rubber or rubber-like material.

According to certain embodiments, the first housing may include at least one through-hole (e.g., the through-hole 211 of FIG. 5) configured to introduce air into the electronic device.

According to certain embodiments of the disclosure, an electronic device (e.g., the electronic device 200 of FIG. 2) may include a housing (e.g., the housing 202 of the FIG. 2) including a first housing (e.g., the first housing 210 of the FIG. 2) and a second housing (e.g., the second housing 220 of the FIG. 2) configured to rotate with respect to the first housing, a hinge module (e.g., the hinge module 300 of FIG. 4) which is connected to the first housing and the second housing and includes a rotation gear (e.g., the rotation gear 310 of FIG. 6), a gear assembly (e.g., the gear assembly 400 of FIG. 6) including a pinion gear (e.g., the pinion gear 410 of FIG. 6) rotatably connected to the rotation gear, a rack gear (e.g., the rack gear 420 of FIG. 6) configured to slide based on rotation of the pinion gear, and a cam structure (e.g., the cam structure 430 of FIG. 6) connected to the rack gear, and a foot structure connected to the first housing, the foot structure (e.g., the foot structure 500 of FIG. 6) including a foot structure holder (e.g., the foot structure holder 510 of FIG. 6) including a protruding area (e.g., the protruding area 511 of FIG. 6) configured to receive pressure provided from the cam structure, and a support area (e.g., the support area 550 of FIG. 6) coupled to the foot structure holder and configured to support the electronic device.

According to certain embodiments, the rotation gear may include a first gear area (e.g., the first gear area 311 of FIG. 6) including a first curved-surface (e.g., the first curved-surface 311*a* of FIG. 6) and a first gear tooth (e.g., the first gear teeth 311*b* of FIG. 6) configured to protrude from the first curved-surface, and a second gear area (e.g., the second gear area 313 of FIG. 6) including a second curved-surface (e.g., the second curved-surface 313*a* of FIG. 6) which is configured to extend from the first curved-surface and be exposed to the outside of the rotation gear.

According to certain embodiments, the hinge module may include a first rotation gear (e.g., the first rotation gear 321 of FIG. 7) connected to the first housing, a second rotation gear (e.g., the second rotation gear 322 of FIG. 7) connected to the second housing, and multiple idle gears (e.g., the idle gear 323 of FIG. 7) connected to the first rotation gear and the second rotation gear, and the pinion gear may include a first pinion gear (e.g., the first pinion gear 411 of FIG. 7) configured to engage with the first rotation gear, and a second pinion gear (e.g., the second pinion gear 412 of FIG. 7) configured to engage with the first pinion gear and the rack gear.

According to certain embodiments, the gear assembly may include a plate (e.g., the plate 440 of FIG. 6) connected to the rack gear, and the foot structure may include a guide member (e.g., the guide member 530 of FIG. 7) including an accommodation groove (e.g., the accommodation groove 531 of FIG. 7) configured to guide a movement of the plate.

According to certain embodiments, the electronic device may further include an input device (e.g., the input device 206 of FIG. 2) accommodated in the first housing, a touch pad (e.g., the touch pad 208 of the FIG. 2) accommodated in the first housing, and a display (e.g., the display 204 of FIG. 2) accommodated in the second housing.

The electronic device including the foot structure of the disclosure described above may not be limited by the above-described embodiments and drawings, and it will be obvious to a person skilled in the technical field, to which the disclosure belongs, that certain substitutions, modifications, and changes are possible within the technical scope of the disclosure. Accordingly, the scope of the invention is not to be limited by the above embodiments but by the claims and the equivalents thereof.

What is claimed is:

1. An electronic device comprising:
    a housing assembly comprising a first housing and a second housing configured to rotate with respect to the first housing;
    a hinge module that is coupled to the first housing and the second housing, the hinge module comprising a rotation gear configured to rotate about a first rotation axis;
    a gear assembly comprising a pinion gear rotatably coupled to the rotation gear and configured to rotate about a second rotation axis parallel to the first rotation axis, a rack gear configured to slide in a first axial direction based on rotation of the pinion gear, wherein the rack gear has teeth along on a plane substantially parallel to a surface of the first housing;
    a cam structure coupled to the rack gear; and
    a foot structure coupled to the first housing, the foot structure being;
        moveable in a second axial direction that perpendicular to the first axial direction based on a first movement of the cam structure, and
        moveable in a third axial direction opposite to the second axial direction based on a second movement of the cam structure.

2. The electronic device of claim 1, wherein the foot structure comprises:
    a foot structure holder comprising a protruding area, the protruding area is configured to face at least a part of the gear assembly and be in contact with the cam structure.

3. The electronic device of claim 1, wherein the rotation gear comprises:
    a first gear area comprising a first curved-surface and a first gear tooth that protrudes from the first curved-surface, and a second gear area comprising a second curved-surface that extends from the first curved-surface and be exposed to the outside of the rotation gear.

4. The electronic device of claim 3,
    wherein the first housing rotates with respect to the second housing when the pinion gear corresponds to the first gear area, and
    the foot structure moves when the pinion gear is disposed to the first gear area.

5. The electronic device of claim 4, wherein:
    the first housing comprises a first front surface and a first rear surface opposite to the first front surface;
    the second housing comprises a second front surface and a second rear surface opposite to the second front surface; and
    the second housing is rotatable with respect to the first housing such that the first front surface is transitionable to face the second front surface and the first rear surface is transitionable to face the second rear surface.

6. The electronic device of claim 1, wherein the hinge module comprises:
    a first rotation gear connected to the first housing;
    a second rotation gear coupled to the second housing; and
    a plurality of idle gears coupled to the first rotation gear and the second rotation gear.

7. The electronic device of claim 6, wherein:
    the pinion gear comprises a first pinion gear configured to engage with the first rotation gear; and
    a second pinion gear configured to engage with the first pinion gear and the rack gear.

8. The electronic device of claim 1, further comprising:
    an input device accommodated in the first housing; and
    a touch pad accommodated in the first housing.

9. The electronic device of claim 1, further comprising a display accommodated in the second housing.

10. The electronic device of claim 1, wherein:
    the gear assembly comprises a plate that is coupled to the rack gear, and
    the foot structure comprises a guide member comprising an accommodation groove to guide a movement of the plate.

11. The electronic device of claim 10, wherein:
    the foot structure comprises at least one fastening member connected to the guide member and the first housing.

12. The electronic device of claim 10, wherein:
the plate comprises a first surface and a second surface opposite to the first surface; and
the rack gear is disposed on the first surface; and
the cam structure is disposed on the second surface.

13. The electronic device of claim 1, wherein the foot structure comprises:
a wing part configured to extend from a protruding area which is configured to be in contact with the cam structure; and
at least one elastic member disposed between the wing part and the first housing.

14. The electronic device of claim 1, wherein the foot structure comprises:
a support area which is configured to be exposed to the outside of the electronic device and comprises rubber.

15. The electronic device of claim 1, wherein the first housing comprises:
at least one through-hole configured to introduce air into the electronic device.

16. An electronic device comprising:
a housing comprising a first housing and a second housing configured to rotate with respect to the first housing;
a hinge module which that is connected coupled to the first housing and the second housing, the hinge module comprising and comprises a rotation gear configured to rotate about a first rotation axis;
a gear assembly comprising a pinion gear rotatably connected coupled to the rotation gear and configured to rotate about a second rotation axis parallel to the first rotation axis, a rack gear configured to slide based on rotation of the pinion gear, wherein the rack gear has teeth along on a plane substantially parallel to a surface of the first housing; and
a cam structure connected to the rack gear; and
a foot structure connected to the first housing, the foot structure comprising a foot structure holder comprising a protruding area configured to receive pressure provided from the cam structure, and a support area connected to the foot structure holder and configured to supporting the electronic device.

17. The electronic device of claim 16, wherein:
the rotation gear comprises a first gear area comprising a first curved-surface and a first gear tooth protruding from the first curved-surface; and
a second gear area comprising a second curved-surface extending from the first curved-surface and be exposed to the outside of the rotation gear.

18. The electronic device of claim 17, wherein the hinge module comprises:
the hinge module comprises a first rotation gear connected to the first housing;
a second rotation gear connected to the second housing; and
a plurality of multiple idle gears connected coupled to the first rotation gear and the second rotation gear; and
the pinion gear comprising a first pinion gear configured to engage with the first rotation gear, and a second pinion gear configured to engage with the first pinion gear and the rack gear.

19. The electronic device of claim 16, wherein:
the gear assembly comprises a plate connected to the rack gear; and
the foot structure comprises a guide member comprising an accommodation groove to guide a movement of the plate.

20. The electronic device of claim 16, further comprising:
an input device accommodated in the first housing;
a touch pad accommodated in the first housing; and
a display accommodated in the second housing.

21. The electronic device of claim 1, wherein the pinion gear is engaged with the teeth of the rack gear.

22. The electronic device of claim 1, wherein the foot structure is moveable in the third axial direction to protrude from the first housing.

23. The electronic device of claim 1, wherein the foot structure is movable in the third axial direction to increase a distance between the first housing and a ground on which the electronic device seated.

* * * * *